(12) United States Patent
Kordahi

(10) Patent No.: US 6,571,042 B1
(45) Date of Patent: May 27, 2003

(54) MULTI-BODY MODULAR REPEATER SYSTEM AND ARTICULATED HOUSING FOR USE THEREWITH

(75) Inventor: Maurice Kordahi, Atlantic Highlands, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 51 days.

(21) Appl. No.: 09/669,638

(22) Filed: Sep. 26, 2000

(51) Int. Cl.[7] .................................................. G02B 6/36
(52) U.S. Cl. ......................... 385/100; 359/179; 403/84; 174/705
(58) Field of Search ........................... 174/32, 33, 705, 174/706, 86; 359/179; 385/25, 70, 100; 439/8; 403/93, 84

(56) References Cited

U.S. PATENT DOCUMENTS

| | | | | |
|---|---|---|---|---|
| 4,757,157 A | * | 7/1988 | Pelet | 174/50 |
| 4,785,139 A | | 11/1988 | Lynch et al. | 174/70 |
| 5,018,980 A | * | 5/1991 | Robb | 439/8 |
| 5,110,224 A | | 5/1992 | Taylor et al. | 385/25 |
| 5,197,817 A | * | 3/1993 | Wood et al. | 403/93 |

FOREIGN PATENT DOCUMENTS

JP 9-258082 * 10/1997

* cited by examiner

Primary Examiner—Michael C. Zappoli (57) ABSTRACT

A multi-body modular repeater system is capable of accommodating an increased number of fibers in an undersea fiber optic system. The system includes at least two repeater bodies connected in tandem with fiber optic cables coupled to the ends of the series of repeater bodies. A first plurality of optical fibers is amplified in one of the repeater bodies and a second plurality of fibers is amplified in the other repeater body connected in tandem. When the number of fibers in the fiber optic cable system is further increased, another repeater body may be added to accommodate the circuitry needed to amplify the additional fibers. In one embodiment, the repeater body housings are coupled together using an articulating joint that allows angular deflection of the repeater body housings while substantially preventing circumferential rotation of the repeater body housings with respect to one another. The articulating joint preferably allows angular deflection about at least two axes. One preferred type of articulating joint includes a connecting member coupled to each of the repeater body housings using a gimbal connection.

22 Claims, 5 Drawing Sheets

MULTI-BODY MODULAR REPEATER SYSTEM AND ARTICULATED HOUSING FOR USE THEREWITH

TECHNICAL FIELD

The present invention relates to electronic equipment housings and, more particularly, to an articulated housing used in a multi-body modular repeater system in an undersea environment.

BACKGROUND INFORMATION

Repeaters are commonly used in undersea fiber optic systems to amplify optical signals being transmitted over long distances. A repeater body houses the electronic and optical equipment used to amplify the optical signals and is coupled to a fiber optic cable at each end. Repeaters currently used in undersea fiber optic systems typically accommodate four fiber pairs (i.e., four fibers in each direction of transmission), requiring four amplifier pairs to amplify the optical signals in each of the fibers.

Demands for greater transmission capacity in undersea fiber optic systems have created a need to increase the number of fiber pairs per system in the undersea fiber optic cables. Recent design proposals for fiber optic cables use up to eight fiber pairs (i.e., sixteen total fibers), but the existing repeater bodies have insufficient volume to house the additional amplifier pairs needed to amplify the additional fibers. Future cable system designs are likely to require even more fiber pairs and thus more amplifier pairs.

The use of the fiber optic systems in an undersea environment presents some unique challenges when designing a new repeater body to accommodate the increased number of fibers and related equipment. The existing repeater bodies are designed to be readily manufactured in a repeater factory, shipped to a cable factory, integrated with cables, transported and stored on a cable ship, deployed from the cable ship, and possibly recovered from the undersea environment. These existing procedures need to be considered when implementing a new repeater design.

One proposed solution has been to merely increase the size of the repeater bodies. A size increase would require procedural modifications for handling, integrating, and testing the larger repeater bodies and would result in multiple repeater housing inventory at the factory. The increase in mass and volume of the larger repeater bodies would also present problems with transporting, storing and deploying the repeater bodies. An increase in the length of the repeater body, for example, would result in the longer repeater body not properly contacting the surface of existing cable drums used to deploy the cable from a cable ship. Furthermore, the larger repeater body would not accommodate additional expansion (e.g., beyond sixteen fibers) without a costly and time consuming redesign effort.

Accordingly, there is a need for a repeater system capable of accommodating an increased number of fibers while taking into consideration the unique issues involved with manufacturing, transporting, storing, deploying, and recovering fiber optic cable and repeaters in an undersea environment.

SUMMARY OF THE INVENTION

In accordance with the present invention, there is provided a multi-body modular repeater system capable of accommodating an increased number of fibers in a fiber optic system. The multi-body modular repeater system comprises at least first and second repeater bodies connected in tandem. Each of the repeater bodies includes at least repeater circuitry. A fiber optic cable coupled to the first repeater body includes at least a first plurality of optical signal paths and a second plurality of optical signal paths. The first plurality of optical signal paths are preferably processed by the repeater circuitry in the first repeater body and the second plurality of optical signal paths preferably pass through the first repeater body. The second plurality of optical signal paths are preferably processed by the repeater circuitry in the second repeater body and the first plurality of optical signal paths preferably pass through the second repeater body.

In one embodiment, the repeater bodies are connected in tandem with a jumper cable. In another embodiment, the repeater bodies are connected in tandem with an articulating joint.

In accordance with another aspect of the present invention, there is provided an articulated equipment housing system comprising first and second housings for housing electronic equipment. An articulating joint preferably connects the first and second housings to allow angular deflection of the housings while substantially preventing circumferential rotation of the housings with respect to one another. The articulating joint includes a passageway for allowing signal paths to pass through between the first and second housings. A first cable coupling at one end of the first housing is used to couple the first housing to a cable, and a second cable coupling at one end of the second housing is used to couple the second housing to a cable.

According to one embodiment of this aspect of the present invention, a connecting member is connected to at least one of the first and second housings using a gimbal connection. One variation of the connecting member in this embodiment has a neck extending between two wider end portions. Another variation of this connecting member has a wider central portion between the end portions.

According to a further embodiment of the articulating joint aspect of the present invention, a connecting member includes a first end portion pivotally connected to the first repeater body such that the connecting member pivots with respect to the first repeater body about a first axis. The connecting member includes a second end portion pivotally connected to the second repeater body such that the connecting member pivots with respect to the second repeater body about a second axis substantially perpendicular to a plane containing the first axis.

According to yet another embodiment of the articulating joint aspect, first and second connecting members are pivotally coupled to respective first and second repeater bodies such that the first and second connecting members pivot about respective first and second axes with respect to the respective repeater bodies. The first and second connecting members are pivotally coupled and pivot with respect to one another about a third axis substantially perpendicular to a plane containing the first and second axes.

In accordance with yet another aspect of the present invention, there is provided a method of processing a plurality of optical signals carried on optical signal paths within a fiber optic cable connected, in tandem, to first and second processing locations. The method comprises processing optical signals carried on a first plurality of optical signal paths at the first processing location. The optical signals on a second plurality of optical signal paths pass through the first processing location. The optical signals carried on the second plurality of optical signal paths are processed at the second processing location. The optical signals on the first plurality of optical signal paths pass through the first processing location.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
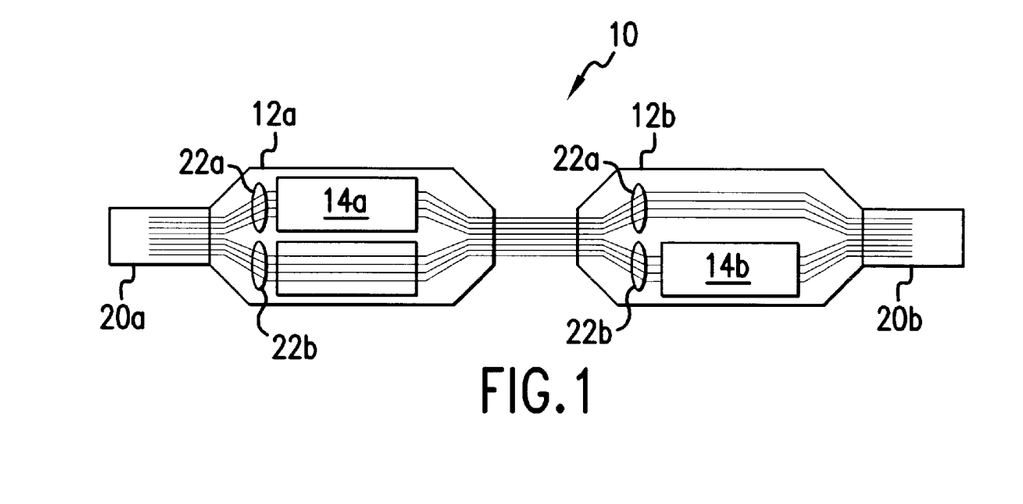
FIG. 1 a detailed cross-sectional schematic diagram of a multi-body modular repeater system, according to one embodiment of the present invention highlighting the fiber.

A multi-body modular repeater system 10, shown in FIG. 1, is used to accommodate an increased number of fibers in a fiber optic system. Although the multi-body modular. repeater system 10 is particularly suited for use in an undersea fiber optic system, it can be used in any type of fiber optic system.

The repeater system 10 includes at least first and second repeater bodies 12a, 12b connected in tandem. Each of the repeater bodies 12a, 12b houses repeater circuitry 14a, 14b, such as amplifier circuitry used to amplify optical signals in a fiber optic system. Fiber optic cables 20a, 20b are coupled to opposite ends of the series of repeater bodies 12a, 12b. The repeater circuitry and fiber optic cables are known to those in the field of fiber optics, and the present invention is not limited to any particular type of circuitry or fiber optic cable structure.

Optical signal paths 22a, 22b (e.g., optical fibers) pass from the fiber optic cable 20a into the first repeater body 12a. Optical signals transmitted by the first plurality of optical signal paths 22a are processed by the repeater circuitry 14a in the first repeater body 12a. The second plurality of optical signal paths 22b pass through the first repeater body 12a without processing. The optical signal paths 22a, 22b pass into the second repeater body 12b. In the second repeater body 12a, optical signals transmitted by the second plurality of optical signal paths 22b are processed by the repeater circuitry 14b. The first plurality of optical signal paths. 22a pass through the second repeater body 12b without processing. In this example, having two repeater bodies 12a, 12b, the optical signal paths 22a, 22b then pass into the fiber optic cable 20b coupled to the second repeater body 12b. Thus, the optical signals are processed by the repeater system 10 in a "leap-frog" manner.

This multi-body modular repeater system 10 having two or more repeater bodies 12a, 12b in tandem allows the number of fiber optic signal paths or fibers to be doubled while using repeater bodies of essentially the same size. In the exemplary embodiment, the multi-body modular repeater system 10 is used to increase the number of fibers from four fiber pairs to eight fiber pairs using this concept of amplifying in a "leap-frog" manner. The signals in half of the cabled fibers (i.e., 4 fiber pairs) are amplified in the first repeater body 12a and the signals in the other half of the cable fibers (i.e., 4 fiber pairs) are amplified in the second repeater body 12b. Although two repeater bodies are shown and described, additional repeater bodies can be connected in tandem to accommodate additional fibers, for example, more than eight fiber pairs and still be within the scope of the present invention.

Figure 2:
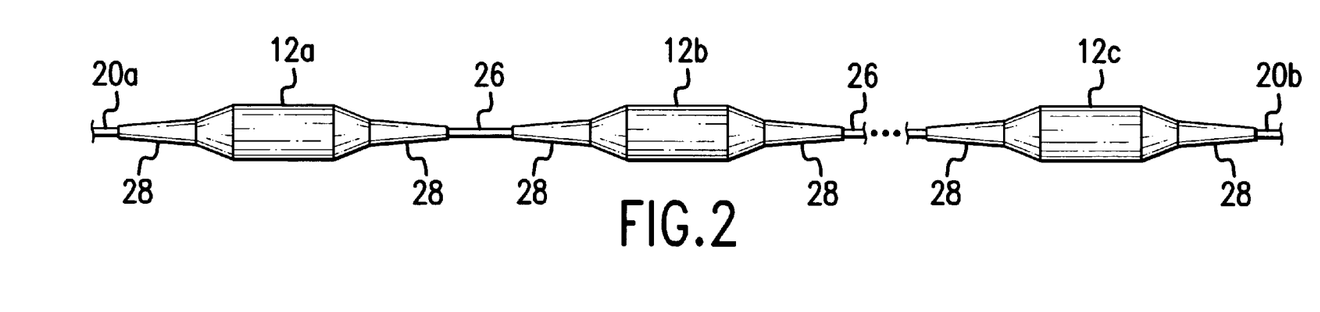
FIG. 2 is a schematic diagram of a multi-body modular repeater system, according to another embodiment of the present invention.

According to one embodiment, multiple repeater bodies 12a–12c, FIG. 2, are connected in tandem using a short cable length or jumper cable 26, which holds the fibers passing between the repeater bodies 12a–12c. The jumper cable 26 can have a length of about 100 meters. Both the fiber optic cables 20a, 20b and jumper cables 26 are coupled to the repeater bodies 12a–12c using repeater couplings 28. Such couplings 28 are known to those in the field of fiber optics, and the present invention is not limited to any particular type of coupling.

According to an alternative embodiment, the concept of amplifying in a "leap-frog" manner is applied to a fiber optic system having repeater bodies connected using standard fiber optic cables. Each set of optical signal fibers is amplified at distant alternate repeater body sites in the fiber optic system. In this system, the successive repeater bodies are spaced at about one-half the normal section length. If the prescribed nominal spacing between amplifiers is about 50 km, for example, the successive repeaters in this alternative embodiment are spaced at about 25 km.

Figure 3:
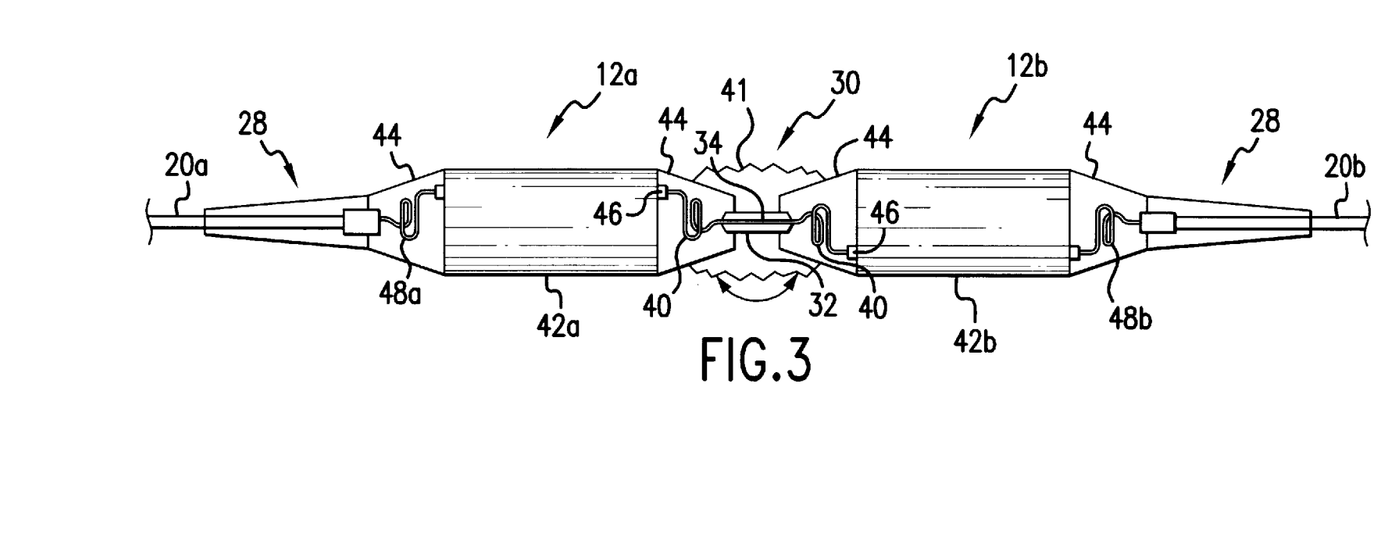
FIG. 3 is a schematic diagram of a multi-body modular repeater system, according to yet another embodiment of the present invention.

According to another embodiment, an articulating joint 30, FIG. 3, is used to connect the repeater bodies 12a, 12b in tandem. The articulating joint 30 includes one or more connecting members 32 having a passageway 34 extending therethrough for allowing the optical fibers to pass from one repeater body 12a to the connected repeater body 12b. The connecting member 32 is hinged to each of the repeater bodies 12a, 12b such that the articulating joint 30 allows angular deflection of the repeater bodies 12a, 12b, while substantially preventing circumferential rotation of the repeater bodies 12a, 12b with respect to one another. The articulating joint 30 preferably provides angular deflection in at least two directions, as described in greater detail below. The connecting member 32 is preferably made of a material similar to the material used for the repeater housings 42a, 42b, such as beryllium copper. Other suitable materials having the desired strength and corrosion resistance can also be used, such as titanium. The articulating joint 30 is preferably covered, for example, with a rubber bellows 41, to provide protection in the undersea environment. Various embodiments of the articulating joint 30 are described in greater detail below.

In the exemplary embodiment, each of the repeater bodies 12a, 12b includes a housing 42a, 42b for housing the circuitry (not shown) and cones 44 connected to each end of the housings 42a, 42b (e.g., threaded onto the housings 42a, 42b). The optical fibers extending between the housings 42a, 42b pass through a pigtail connection 40, such as a conventional polyethylene-clad metallic pigtail, which provides the optical signal transmission and electrical powering connections from one repeater body to the other. The pigtail connections 40 are housed within the cones 44 and are connected to the housings 42 by way of a seal 46. The pigtail connection 40 passes through the passageway 34 in the connecting member(s) 32 and the prevention of circumferential rotation preserves the integrity of the pigtail connection 40. Because the fibers pass through the pigtail connection 40 directly from one repeater body to the other, no splicing is required in the articulating joint 30.

At the opposite ends, the repeater bodies 12a, 12b are coupled to the fiber optic cables 20a, 20b using a coupling 28. This embodiment, using the articulating joint 30, has an advantage over the embodiment shown in FIG. 2 in that only two couplings 28 are required at the end of the series or chain of repeater bodies. In contrast, the embodiment shown in FIG. 2 requires couplings 28 at each end of each repeater body. As shown in the exemplary embodiment, a pigtail connection 48a, 48b is also used at these ends to connect the fibers to the respective fiber optic cables 20a, 20b. The structure of the repeater bodies (e.g., the housings, cones, and pigtail connections) His known to those in the field of fiber optics, and repeater bodies having other structures can also be used in the present invention.

Figures 4, 5, 6:
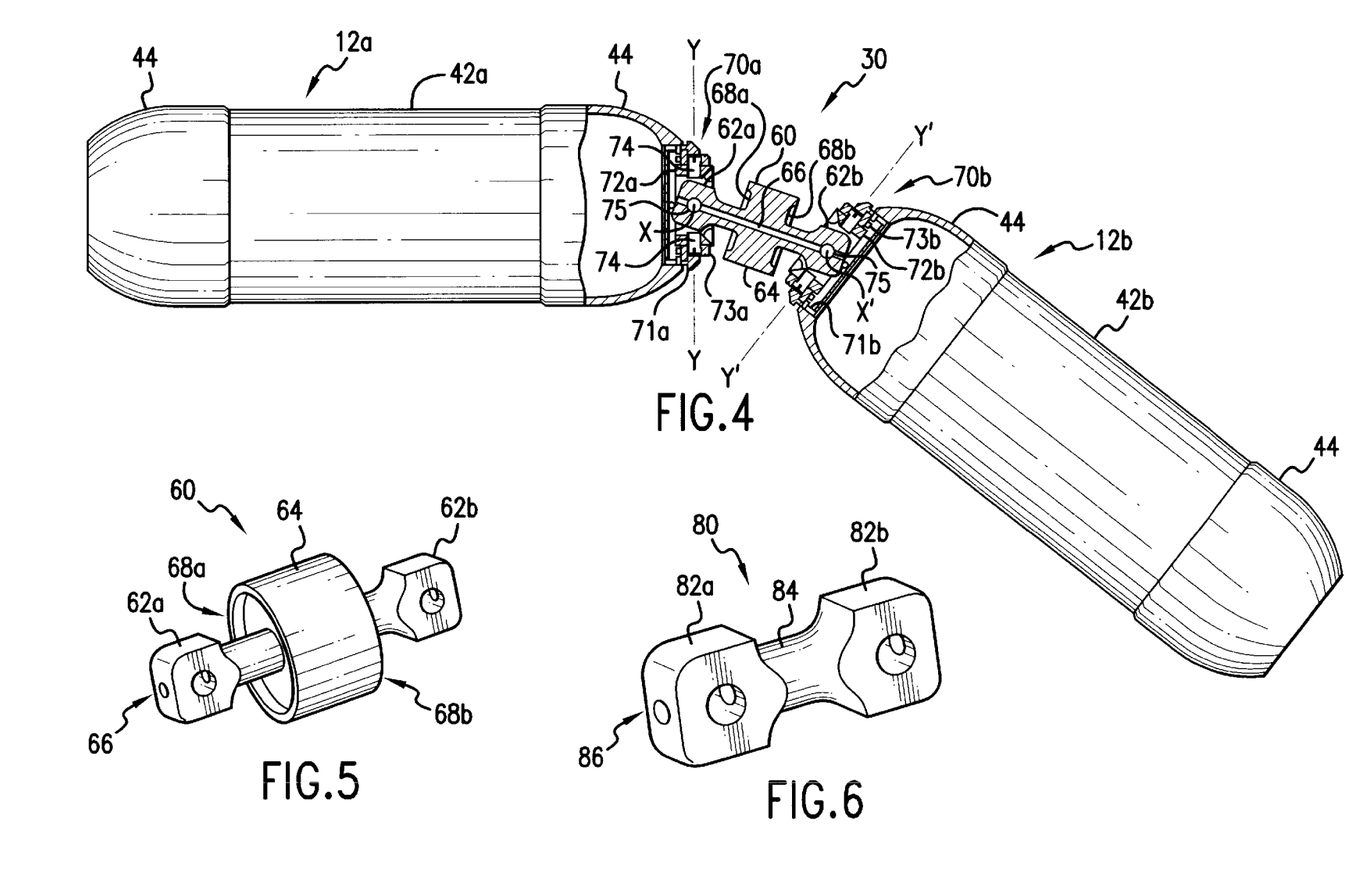
FIG. 4 is a partially cross-sectional view of electronic equipment housings connected by an articulating joint, according to one embodiment of the present invention.
FIG. 5 is a perspective view of a connecting member used in the articulating joint shown in FIG. 4.
FIG. 6 is perspective view of another embodiment of a connecting member that can be used in the articulating joint shown in FIG. 4.

One embodiment of the articulating joint 30 is shown in FIG. 4. According to this embodiment, the articulating joint 30 includes a connecting member 60 connected to each of the repeater bodies 12a, 12b using gimbal connections 70a, 70b to allow angular deflection of the housings 42a, 42b in at least two directions. A first ring 71a, 71b is secured to each cone 44 at the end of the respective housings 42a, 42b and a second ring 73a, 73b is secured to the first ring 71a, 71b. Gimbal connection members 72a, 72b are pivotally coupled within the respective second rings 73a, 73b using coaxial pins 74. The gimbal connection members 72a, 72b thus pivot with respect to the housings 42a, 42b about the axis Y-Y and the axis Y'-Y' respectively.

First and second connection end portions 62a, 62b of the connecting member 60 are pivotally coupled to respective gimbal connection members 72a, 72b using pins 75. The connecting member 60 thereby pivots with respect to the first gimbal connection member 72a about the axis X-X and pivots with respect to the second gimbal connection member 72b about the axis X'-X'. FIG. 4 depicts the X-X and X'-X' axes in a direction into the paper (i.e., perpendicular to Y-Y and Y'-Y' axes respectively). Each gimbal connection 70a, 70b thus provides two mutually perpendicular and intersecting axes of rotation. The gimbal connections 70a, 70b also incorporate torque restraints to prevent circumferential rotation, for example, about the longitudinal axes of the housings 42a, 42b. In particular, the flat sides of the connection end portions 62a, 62b are received between matching flats inside the gimbal connection members 72a, 72b to prevent circumferential rotation.

Although one exemplary embodiment is shown and described, the connecting member 60 can also be coupled using other types of gimbal or universal joint connections or any other type of connection providing the desired angular deflection.

One embodiment of the connecting member 60, FIG. 5, has a "bar-bell" shape and includes a wider central portion 64 between the end portions 62a, 62b. A passageway 66 extends through the "bar-bell" shaped connecting member 60 for receiving the pigtail connection, as described above. The wider central portion 64 includes annular recesses 68a, 68b facing the respective connection end portions 62a, 62b. The wider central portion 64 allows the "bar-bell" shaped connecting member 60 to be longer and allows for a greater deflection angle. The annular recesses 68a, 68b receive the rings 73a, 73b such that the central portion 64 acts as a stop block and rides on both of the rings 73a, 73b when the repeaters are at a maximum angular deflection.

According to another embodiment, a "dog bone" shaped connecting member 80, see FIG. 6, can be used in the articulating joint 30 shown in FIG. 4. The "dog bone" shaped connecting member 80 includes first and second connection ends 82a, 82b and a narrower neck 84. The "dog bone" shaped connecting member 80 also includes a passageway 86 extending therethrough for receiving the pigtail connection. The "dog bone" shaped connecting member 80 is pivotally coupled to the housings 42a, 42b using the gimbal connections 70a, 70b in the same manner as the "bar-bell" shaped connecting member 60 described above.

The "dog bone" shaped connecting member 80 is lighter than the "bar bell" shaped connecting member 60, but is also shorter and does not allow as much angular deflection. Connecting members having other shapes can also be used between the gimbal connections 70a, 70b in this embodiment of the articulating joint 30.

Figures 7, 8, 9:
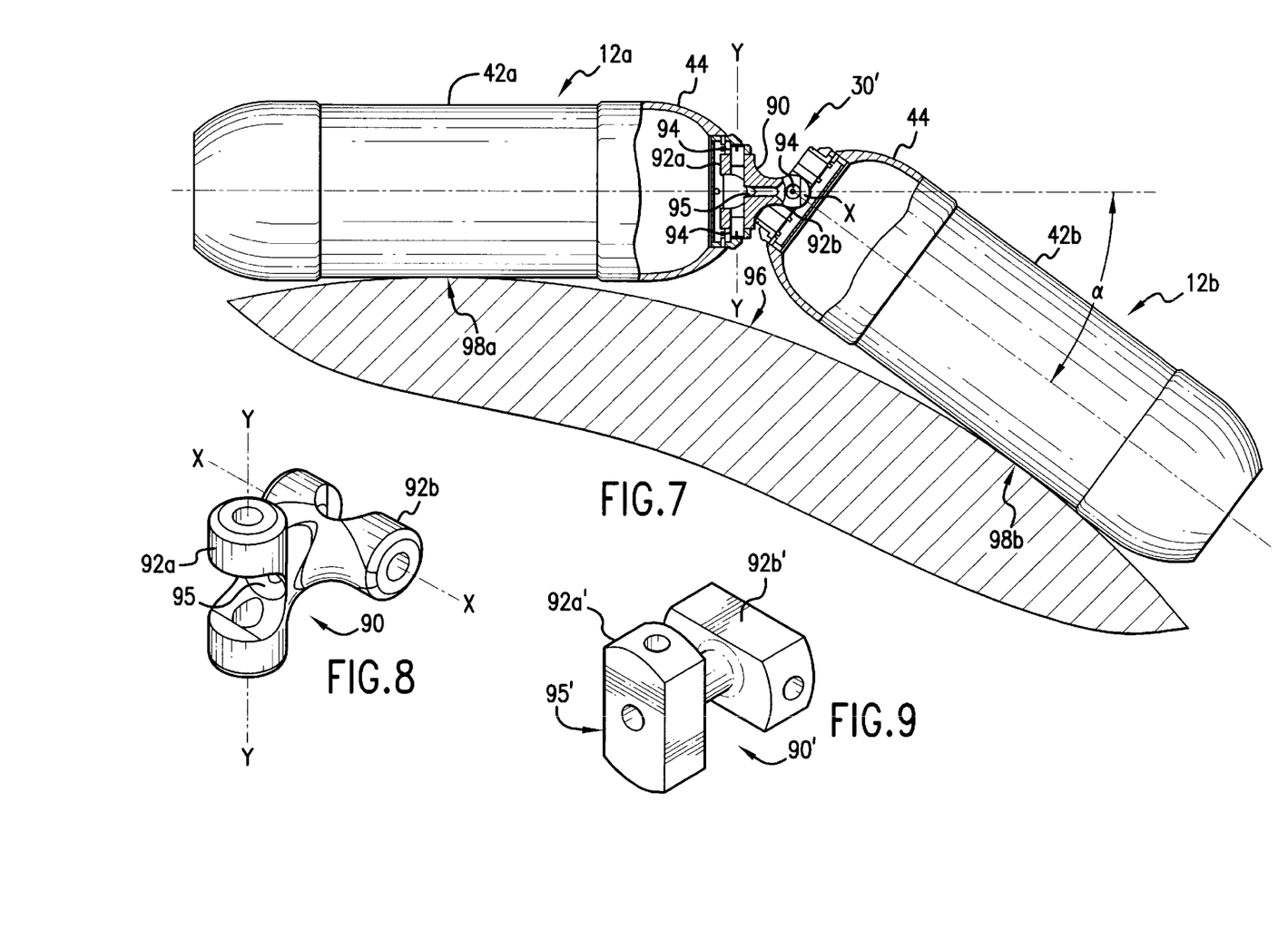
FIG. 7 is a partially cross-sectional view of electronic equipment housings connected by an articulating joint, according to another embodiment.
FIG. 8 is a perspective view of a connecting member used in the articulating joint shown in FIG. 7.
FIG. 9 is a perspective view of another embodiment of a connecting member that can be used in the articulating joint shown in FIG. 7.

According to another embodiment, the articulating joint 30', FIG. 7, includes a connecting member 90 that is pivotally coupled to each of the housings 42a, 42b about different perpendicular axes. The connecting member 90, shown in greater detail in FIG. 8, includes first and second connections ends 92a, 92b with different perpendicular axes of rotation. The first connection end 92a is pivotally coupled to the cone 44 on the first housing 42a using coaxial pins 94, such that the connecting member 90 pivots with respect to the first housing 42a about an axis Y-Y. The second connection end 92b is pivotally coupled to the cone 44 of the second housing 42b such that the connecting member 90 pivots with respect to the second housing 42b about the axis X-X. The axis X-X is preferably substantially perpendicular to a plane containing the axis Y-Y but does not intersect the axis Y-Y.

Another variation of the connecting member 90' is shown in FIG. 9. The connecting member 90' is pivotally coupled to the cones 44 of the housings 42a, 42b in the same manner as the connecting member 90 described above. Both of these connecting members 90, 90' include a passageway 95, 95' for receiving the pigtail connection. Although the connecting members 90, 90' are capable of providing the desired articulation, the "bar bell" shaped connecting member 60 and the "dog bone" shaped connecting member 80 may be preferred for purposes of manufacturing and assembly.

Figures 10, 11:
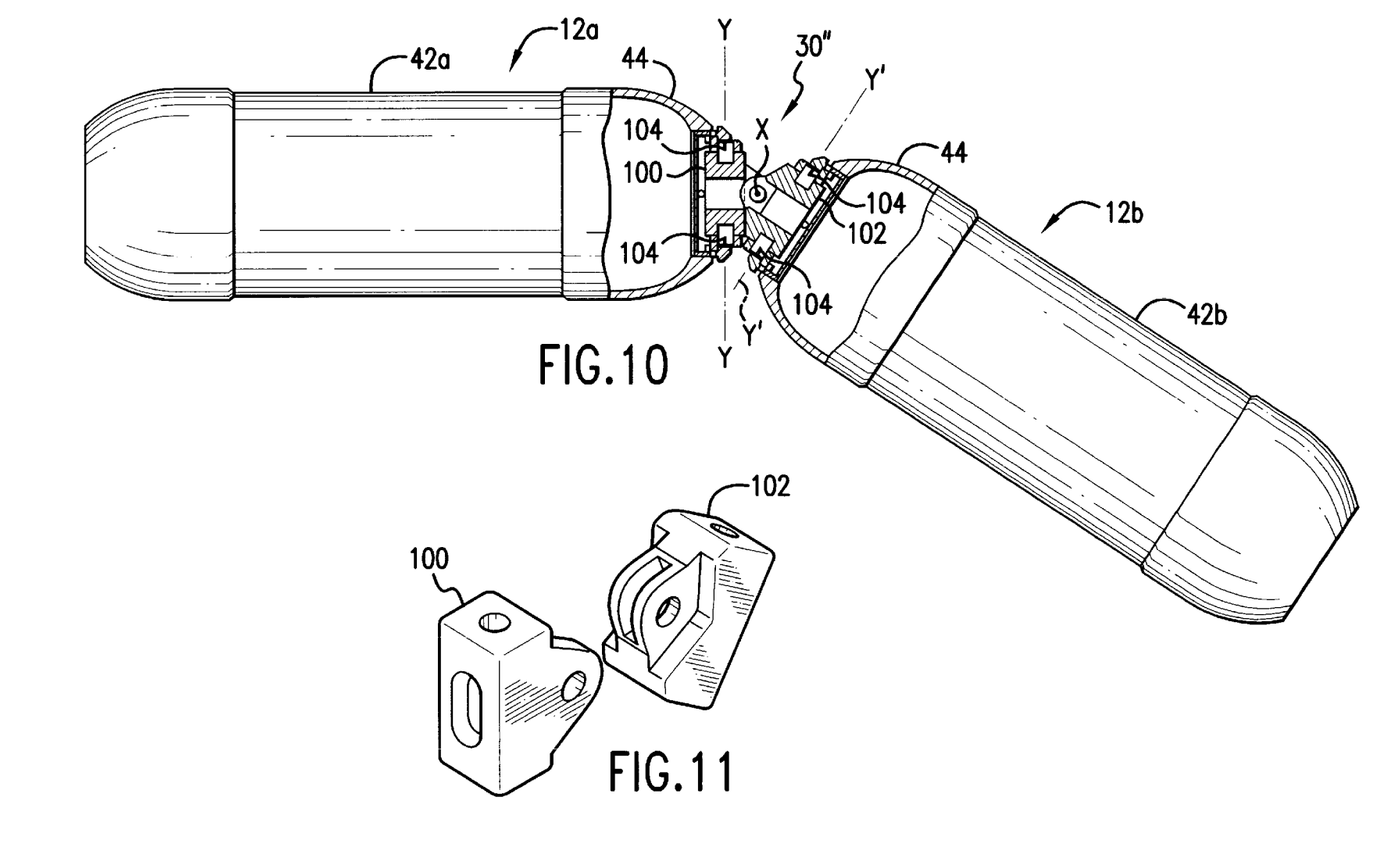
FIG. 10 is a partially cross-sectional view of electronic equipment housings connected by an articulating joint, according to a further embodiment.
FIG. 11 is a perspective view of the connecting members used in the articulating joint shown in FIG. 10.

A further embodiment of the articulating joint 30" is shown in FIG. 10. According to this embodiment, the articulating joint 30" includes first and second connecting members 100, 102, as shown in FIG. 11. The first connecting member 100 is pivotally coupled to the cone 44 of the first housing 42a using coaxial pins 104, such that the first connecting member 100 pivots with respect to the first housing 42a about an axis Y-Y. The second connecting member 102 is pivotally coupled to the cone 44 of the second housing 42b such that the second connecting member 102 pivots with respect to the second housing 42b about an axis Y'-Y'. The first and second connecting members 100, 102 are pivotally coupled together such that the first and second connecting members 100, 102 pivot with respect to one another about an axis X-X. The axis X-X is preferably substantially perpendicular to a plane containing the axis Y-Y and the axis Y'-Y' but does not intersect the axes Y-Y and Y'-Y. This type of articulating joint thus provides angular deflection in at least two directions.

Each of the articulating joints 30, 30', 30" in the embodiments described above preferably provides a deflection angle a that allows both repeater bodies 12a, 12b to simultaneously contact the cable drum surface 96 at locations 98a, 98b on the housings 42a, 42b (see FIG. 7). Thus, the housings 42a, 42b preferably carry the load as opposed to the cones 44. In the exemplary embodiment, the deflection angle α is about 36°. Based upon the sizes of the cable drums, the deflection angle a is typically less than about 50°, but deflection angles in excess of 50° can also be achieved.

Although the figures show two housings connected together using the articulating joint, any number of housings can be coupled together using any one of these embodiments of the articulating joint or, for that matter, any combination of these embodiments. By adding additional housings, the repeater system can be greatly expanded to amplify additional fibers when the capacity of the fiber optic cables is expanded further. The present invention can accommodate additional fibers using housings having essentially the same size and type as existing repeater housings, thereby avoiding the inconvenience associated with redesigning, manufacturing, testing, qualifying, storing, transporting, deploying and recovering larger repeater bodies in an undersea fiber optic system. Although the exemplary embodiment describes a repeater system for use with undersea fiber optic cables, the modular articulated housing system described above can be used to house any type of electronic equipment and with any type of cable.

Modifications and substitutions by one of ordinary skill in the art are considered to be within the scope of the present invention, which is not to be limited except by the claims which follow.

What is claimed is:

1. A multi-body modular repeater system for accommodating a plurality of optical signal paths in a fiber optic system, said repeater system comprising:
   at least first and second repeater bodies connected in tandem, wherein each of said repeater bodies includes repeater circuitry;
   a fiber optic cable coupled to said first repeater body, said fiber optic cable including at least a first plurality of optical signal paths and a second plurality of optical signal paths;
   wherein said first plurality of optical signal paths are processed by said repeater circuitry in said first repeater body and said second plurality of optical signal paths pass through said first repeater body; and
   wherein said second plurality of optical signal paths are processed by said repeater circuitry in said second repeater body and said first plurality of optical signal paths pass through said second repeater body.

2. The repeater system of claim 1 wherein said repeater bodies are connected with a jumper cable.

3. The repeater system of claim 1 wherein said repeater bodies are connected with an articulating joint, wherein said articulating joint includes a passageway through which said first and second plurality of optical signal paths extend between said first and second repeater bodies.

4. The repeater system of claim 3 wherein said articulating joint allows angular deflection of said first and second repeater bodies and substantially prevents circumferential rotation of said first and second repeater bodies with respect to one another.

5. The repeater system of claim 3 wherein said articulating joint includes a connecting member pivotally connected to each of said first and second repeater bodies.

6. The repeater system of claim 5 wherein said connecting member is connected to said first and second repeater bodies using a gimbal connection.

7. The repeater system of claim 6 wherein said connecting member includes two end portions and a neck extending between said two end portions, and wherein said end portions are wider than said neck.

8. The repeater system of claim 6 wherein said connecting member includes two end portions and a central portion extending between said two end portions, and wherein said central portion is wider than said end portions and includes recessed regions facing said end portions for receiving ends of said first and second repeater bodies at a maximum deflection angle.

9. The repeater system of claim 3 wherein said articulating joint includes first and second connecting members pivotally coupled to respective said first and second repeater bodies such that said first and second connecting members pivot about respective first and second axes with respect to said first and second repeater bodies, and wherein said first and second connecting members are pivotally coupled together and pivot with respect to one another about a third axis substantially perpendicular to a plane containing said first and second axes.

10. The repeater system of claim 5 wherein said connecting member includes first and second end portions; wherein said first end portion is pivotally connected to said first repeater body such that said connecting member, pivots with respect to said first repeater body about a first axis, and wherein said second end portion is pivotally connected to said second repeater body such that said connecting member pivots with respect to said second repeater body about a second axis substantially perpendicular to a plane containing said first axis.

11. An articulated equipment housing system comprising:
   first and second housings for housing electronic equipment, each of said housings including first and second coupling ends;
   an articulating joint connecting inner ends of said first and second housings, wherein said articulating joint allows angular deflection of said housings and substantially prevents circumferential rotation of said housings with respect to one another, and wherein said articulating joint includes a passageway for allowing a cable to pass through between said first and second housings;
   a first cable coupling at an outer end of said first housing for coupling said outer end of said first housing to a cable; and
   a second cable coupling at an outer end of said second housing for coupling said outer end of said second housing to a cable.

12. The articulated equipment housing system of claim 11 wherein said articulating joint includes a connecting member pivotally connected to each inner end of said first and second housings.

13. The articulated equipment housing system of claim 12 wherein said connecting member is connected to at least one of said first and second housings using a gimbal connection.

14. The articulated equipment housing system of claim 13 wherein said connecting member includes two end portions and a neck extending between said two end portions, and wherein said end portions are wider than said neck.

15. The articulated equipment housing system of claim 13 wherein said connecting member includes two end portions and a central portion extending between said two end portions, and wherein said central portion is wider than said end portions and includes recessed regions facing said end portions for receiving ends of said first and second housings at a maximum deflection angle.

16. The articulated equipment housing system of claim 12 wherein said articulating joint includes first and second connecting members pivotally coupled to respective said first and second repeater bodies such that said first and second connecting members pivot about respective first and second axes with respect to said first and second repeater bodies, and wherein said first and second connecting members are pivotally coupled together and pivot with respect to one another about a third axis substantially perpendicular to a plane containing said first and second axes.

17. The articulated equipment housing system of claim 12 wherein said connecting member includes first and second end portions, wherein said first end portion is pivotally connected to said first repeater body such that said; connecting member pivots with respect to said first repeater body about a first axis, and wherein said second end portion is pivotally connected to said second repeater body such that said connecting member pivots with respect to said second repeater body about a second axis substantially perpendicular to a plane containing said first axis.

18. The articulated equipment housing system of claim 11 wherein said angular deflection is in a range of about 0° to 50°.

19. A modular articulated equipment housing for use in an optical transmission system having repeaters for optical cabling, this modular or replaceable housing comprising:
   at least one housing for housing electronic equipment, said housing including first and second coupling ends; and
   a connecting member connected to at least one of said first and second coupling ends of said housing using a gimbal connection, wherein said connecting member includes two end portions and a central portion extending between said two end portions, and wherein said central portion is wider than said end portions and includes recessed regions facing said end portions.

20. A method of processing a plurality of optical signals carried on optical signal paths within a fiber optic: cable being connected, in tandem, to first and second processing locations, asid method comprising:
   processing optical signals carried on a first plurality of optical signal paths at said first processing location, wherein optical signals on a second plurality of optical signal paths pass through said first processing location; and
   processing said optical carried on said second plurality of optical signal paths at said second processing location, wherein said optical signals of said first plurality of optical signal paths pass through said second processing location.

21. The method of claim 20 wherein said processing locations include repeater circuitry, and wherein processing includes regenerating of said optical signals.

22. The method of claim 20 wherein said processing locations include amplifier circuitry, and wherein processing includes amplifying said optical signals.

* * * * *